United States Patent
Lin

(10) Patent No.: US 9,504,227 B2
(45) Date of Patent: Nov. 29, 2016

(54) AIR SUPPLY APPARATUS FOR EXPERIMENTAL ANIMAL HUSBANDRY EQUIPMENT

(71) Applicant: RUNG SHIN PLASTIC INDUSTRIAL CO., LTD., Taichung (TW)

(72) Inventor: Jung-Yu Lin, Taichung (TW)

(73) Assignee: Rung Shin Plastic IndustriaL Co., Ltd., Taichung (TW)

( * ) Notice: Subject to any disclaimer, the term of this patent is extended or adjusted under 35 U.S.C. 154(b) by 310 days.

(21) Appl. No.: 14/197,315

(22) Filed: Mar. 5, 2014

(65) Prior Publication Data
US 2014/0261221 A1 Sep. 18, 2014

(30) Foreign Application Priority Data
Mar. 14, 2013 (TW) .............................. 102108997 A

(51) Int. Cl.
*A01K 1/03* (2006.01)
*A01K 1/00* (2006.01)

(52) U.S. Cl.
CPC .............. *A01K 1/0047* (2013.01); *A01K 1/031* (2013.01)

(58) Field of Classification Search
CPC ....... A01K 1/03; A01K 1/031; A01K 1/0047
USPC ......................................... 119/417, 418, 500
See application file for complete search history.

(56) References Cited

U.S. PATENT DOCUMENTS

| | | | | |
|---|---|---|---|---|
| 3,220,383 A | * | 11/1965 | Bruner .................. | A01K 1/031 119/419 |
| 3,919,978 A | * | 11/1975 | Schaefer ............... | A01K 1/031 119/500 |

(Continued)

*Primary Examiner* — Daniel J Troy
*Assistant Examiner* — Hiwot Tefera
(74) *Attorney, Agent, or Firm* — Rosenberg, Klein & Lee

(57) ABSTRACT

An air supply apparatus for experimental husbandry equipments includes a frame having a plurality of cubicles formed by a support frame, and a container for containing and breading an experimental animal. The frame has an air supply pipeline comprising a main intake pipe and a main extraction pipe, and a branch intake pipe and a branch extraction pipe are installed between the two main pipes, wherein the branch intake pipe is interconnected with the main intake pipe, and the branch extraction pipe is interconnected to the main extraction pipe, and each branch pipe has a through hole formed at a position corresponsive to each cubicle and a joint for supplying air to the container, and the air supply pipeline has an adjusting device for adjusting the amount of supplied air, so that each container can obtain an equal amount of air.

11 Claims, 6 Drawing Sheets

(56) References Cited

U.S. PATENT DOCUMENTS

| | | | | |
|---|---|---|---|---|
| 4,448,152 A | * | 5/1984 | Niki ...................... | A01K 1/031 119/451 |
| 5,000,120 A | * | 3/1991 | Coiro, Sr. ............. | A01K 1/031 119/419 |
| 5,003,922 A | * | 4/1991 | Niki ...................... | A01K 1/031 119/418 |
| 5,048,459 A | * | 9/1991 | Niki ...................... | A01K 1/031 119/418 |
| 5,148,766 A | * | 9/1992 | Coiro, Sr. ............. | A01K 1/031 119/418 |

(56) References Cited

U.S. PATENT DOCUMENTS

| | | | | |
|---|---|---|---|---|
| 5,307,757 A | * | 5/1994 | Coiro, Sr. | A01K 1/031 119/418 |
| 5,337,696 A | * | 8/1994 | Edstrom | A01K 1/03 119/456 |
| 5,385,118 A | * | 1/1995 | Coiro, Sr. | A01K 1/031 119/417 |
| 5,823,144 A | * | 10/1998 | Edstrom, Sr. | A01K 1/031 119/475 |
| 6,092,487 A | * | 7/2000 | Niki | A01K 1/031 119/420 |
| 6,308,660 B1 | * | 10/2001 | Coiro, Sr. | A01K 1/031 119/419 |
| 8,522,721 B2 | * | 9/2013 | Bernardini | A01K 1/031 119/417 |
| 2011/0041773 A1 | * | 2/2011 | Brielmeier | A01K 1/031 119/419 |
| 2012/0272919 A1 | * | 11/2012 | McClelland | A22B 3/005 119/420 |

* cited by examiner

AIR SUPPLY APPARATUS FOR EXPERIMENTAL ANIMAL HUSBANDRY EQUIPMENT

FIELD OF THE INVENTION

The present invention relates to the field of experimental animal husbandry equipments, in particular to an air supply apparatus for supplying air to the husbandry equipments.

BACKGROUND OF THE INVENTION

In general, a frame with containers is used for breeding experimental animals, and an air supply pipeline is provided for supplying air to each container. However, there are many containers on the frame, so that the air supply pipeline is extended to a very long distance, and the air pressure will be insufficient at the end of the pipeline. As a result, the bred experimental animals may have breathing problems or may even die due to the insufficient supply of air.

In view of the aforementioned problems, the inventor of the present invention based on years of experience in the related industry to conduct extensive researches and experiments, and finally designed and developed an air supply apparatus for experimental animal husbandry equipments in accordance with the present invention to overcome the aforementioned problems of the prior art.

SUMMARY OF THE INVENTION

Therefore, it is a main objective of the present invention to overcome the aforementioned problems of the prior art by providing an air supply apparatus for experimental husbandry equipments, and an adjusting element installed on the air supply pipeline is provided for adjusting the pressure of the air supplied to each breading container, so that the amount of air obtained by each container is constant, so as to maintain a good growing environment for the experimental animals in each container.

To achieve the aforementioned objective, the present invention provides an air supply apparatus for experimental husbandry equipments, comprising:

a frame, partitioned by a plurality of support frames to form a plurality of cubicles; and an air supply pipeline, installed on the frame, and constituting a circulation with an external air filter, and the air supply pipeline including a main intake pipe and a main extraction pipe, and a branch intake pipe and a branch extraction pipe being installed between the two main pipes, and the branch intake pipe being interconnected to the main intake pipe, and the branch extraction pipe being interconnected to the main extraction pipe; and the branch intake pipe and the branch extraction pipe having a through hole formed on each corresponding cubicle, and each through hole includes a joint installed therein; and each branch intake pipe and each branch extraction pipe having an adjusting device for adjusting the amount of supplied air; such that each cubicle is provided for containing and breeding an experimental animal, and two air exchange ports being formed at the rear side of each container and coupled to the joints of the branch intake pipe and the branch extraction pipe of each cubicle respectively.

The aforementioned and other objectives and advantages will become will become clearer in light of the following detailed description of an illustrative embodiment of this invention described in connection with the drawings.

DESCRIPTION OF THE PREFERRED EMBODIMENTS

Figure 1:
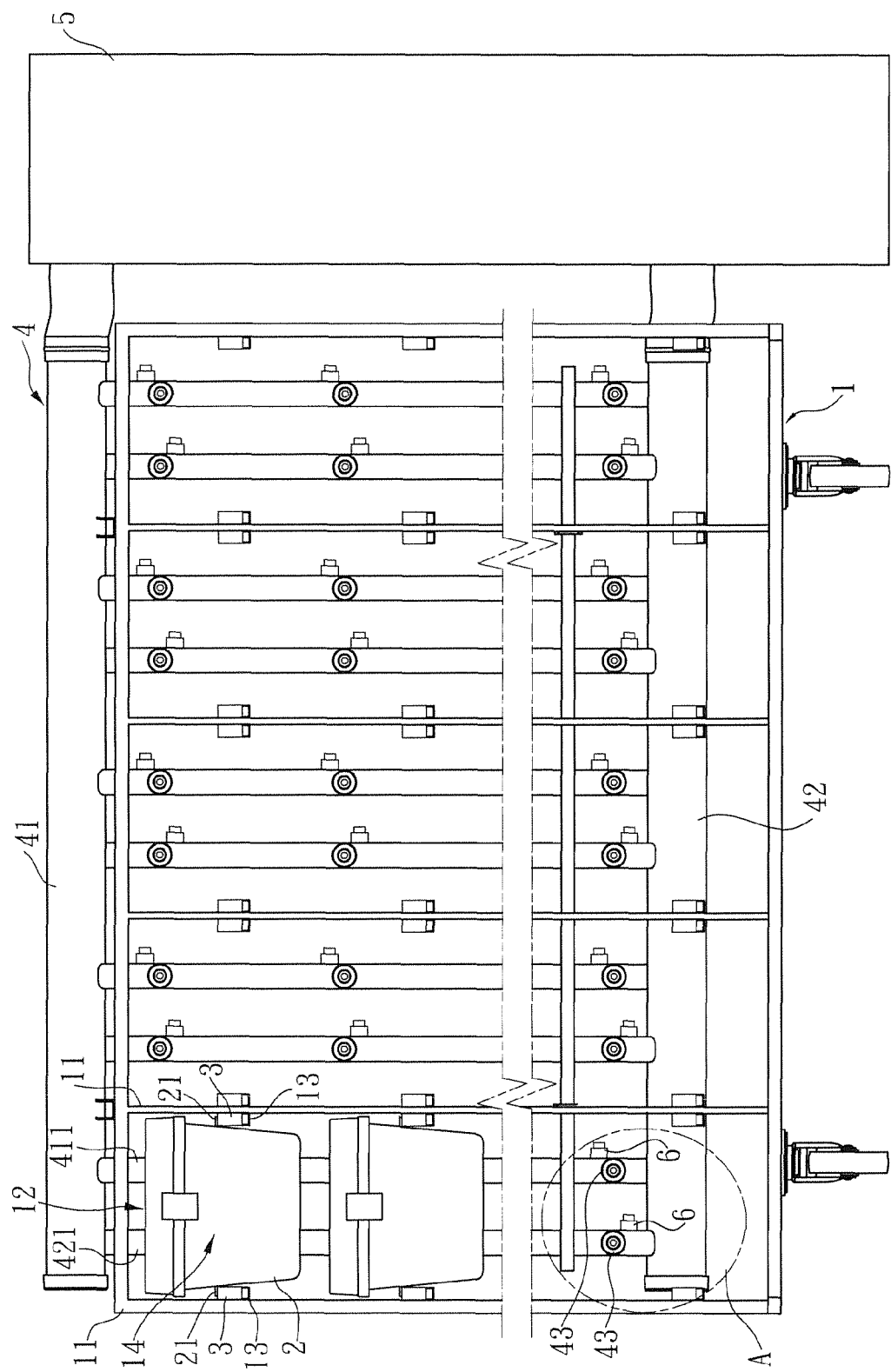
FIG. 1 is a schematic planar view of the present invention.
Figure 2:
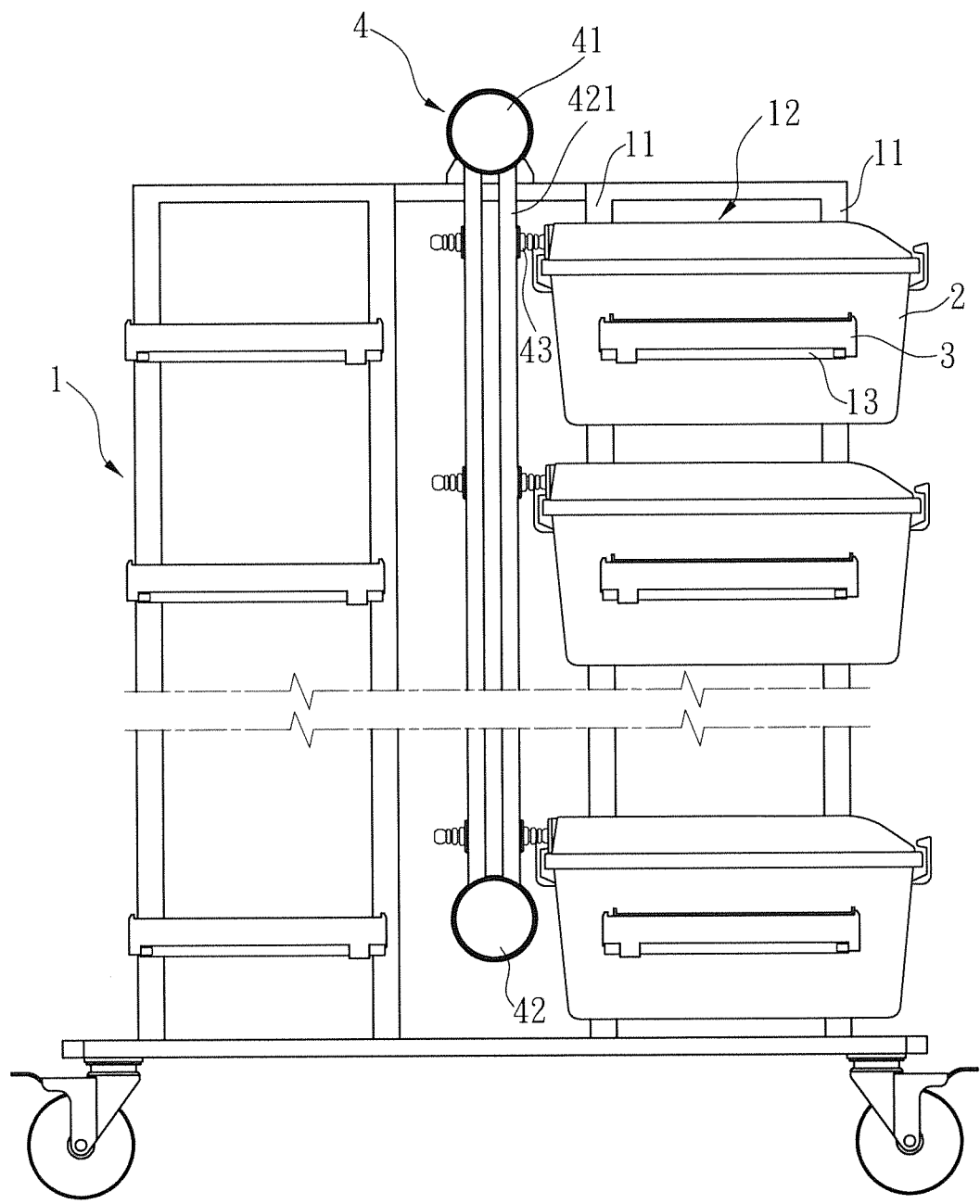
FIG. 2 is a schematic planar view of the present invention viewing from another angle.
Figure 3:
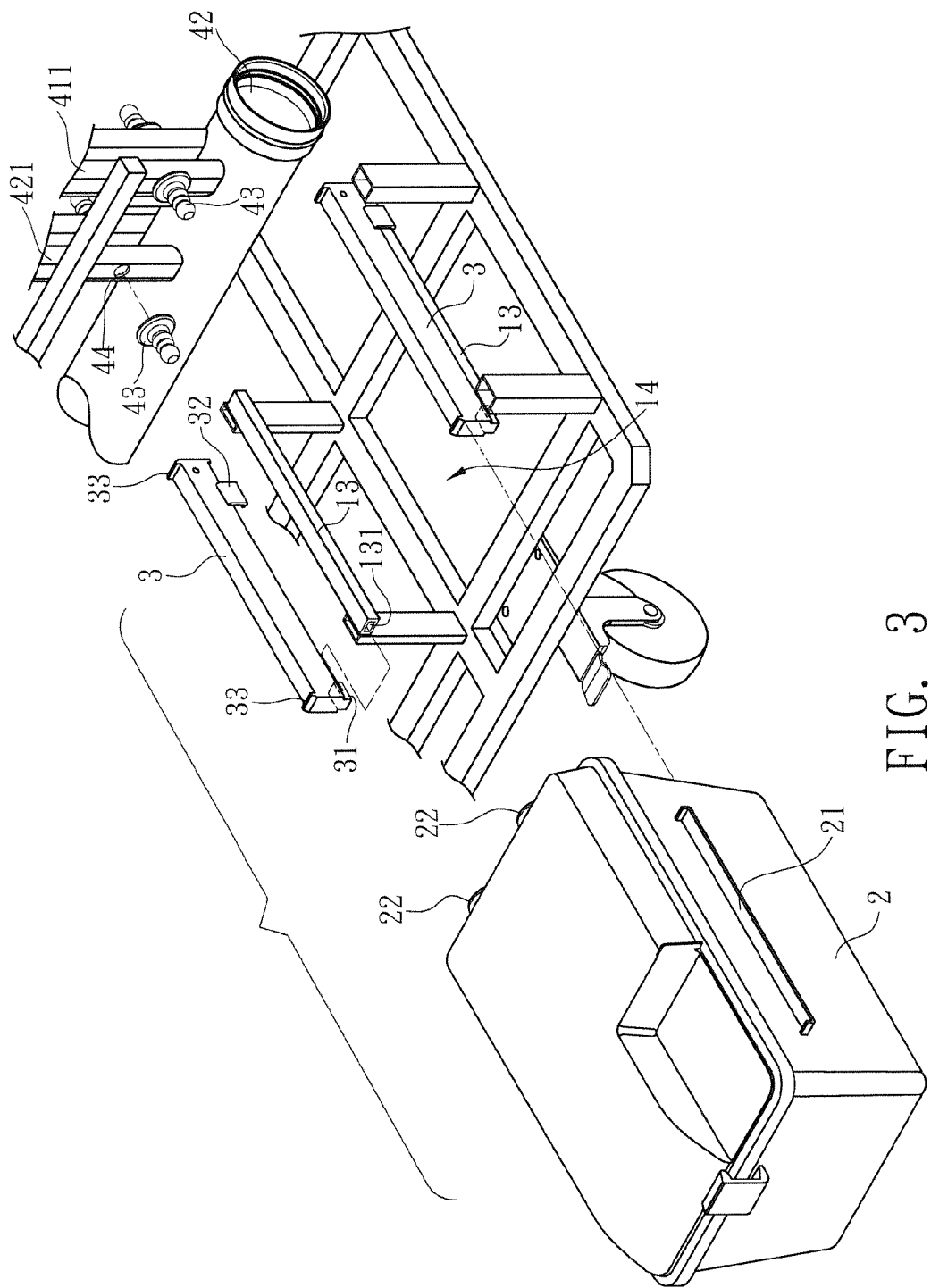
FIG. 3 is a partial exploded view of the present invention.
Figure 4:
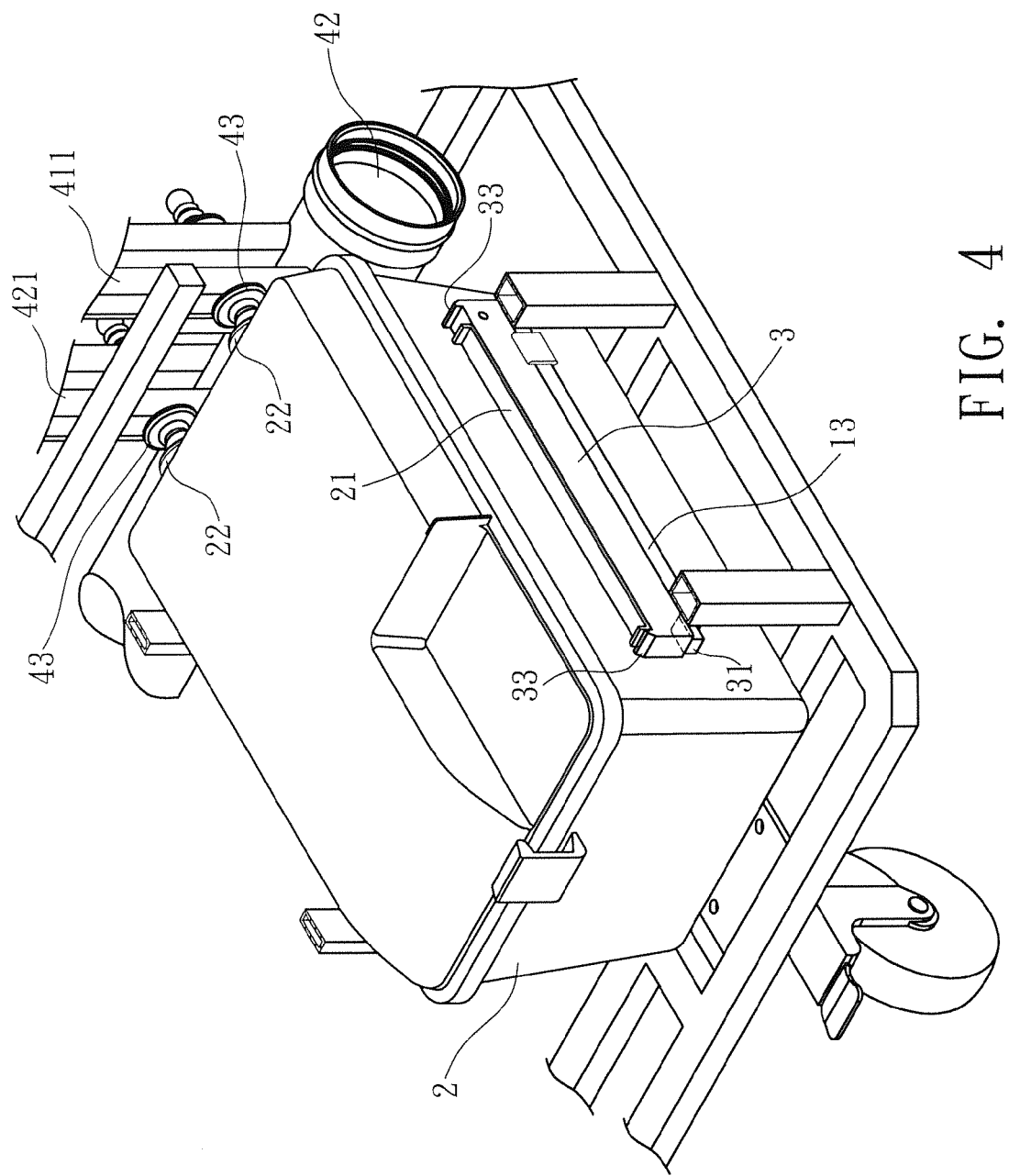
FIG. 4 is a partial perspective view of the present invention.

With reference to FIGS. 1 and 2 for an air supply apparatus for experimental husbandry equipments in accordance with the present invention, the air supply apparatus for experimental husbandry equipments comprises: a frame 1, having at least one vertical unit 12 formed and enclosed by a plurality of vertical support frames 11, and a pair of transversal support frames 13 symmetrically disposed on both sides of each vertical unit 12, and each vertical unit 12 has a cubicle 14 formed at the position of transversal support frame 13 and provided for mounting the container 2b for breeding the experimental animal thereon. In this preferred embodiment as shown in FIGS. 3 and 4, each transversal support frame 13 is hollow and has an embedding hole 131 formed thereon, and each transversal support frame 13 has a pad 3, such that both sides of the wing portions 21 of the container 2 abuts the pad 3 to position the container 2 into the cubicle 14. Wherein, a fitting element 31 is extended backwardly from the front side of the bottom of the pad 3 and provided for embedding the pad 3 into the embedding hole 131 of the transversal support frame 13 through the fitting element 31 and fixing the pad 3 to the transversal support frame 13. In addition, a positioning portion 32 in the shape of a hook is extended from the bottom of each of the left and right sides of the pad 3 for downwardly hooking the transversal support frame 13 to enhance the effect of fixing the pad 3 onto the transversal support frame 13. A stop portion 33 extended upwardly from the top of both front and back sides of the pad 3, so that when the wing portion 21 of the container 2 abuts the pad 3 and installed in the cubicle 14, the wing portion 21 of the container 2 is stopped by the stop portions 33 at the front and rear of the pad 3 to provide a position limiting effect, so as to prevent the container 2 from falling out from the cubicle 14.

Figure 5:
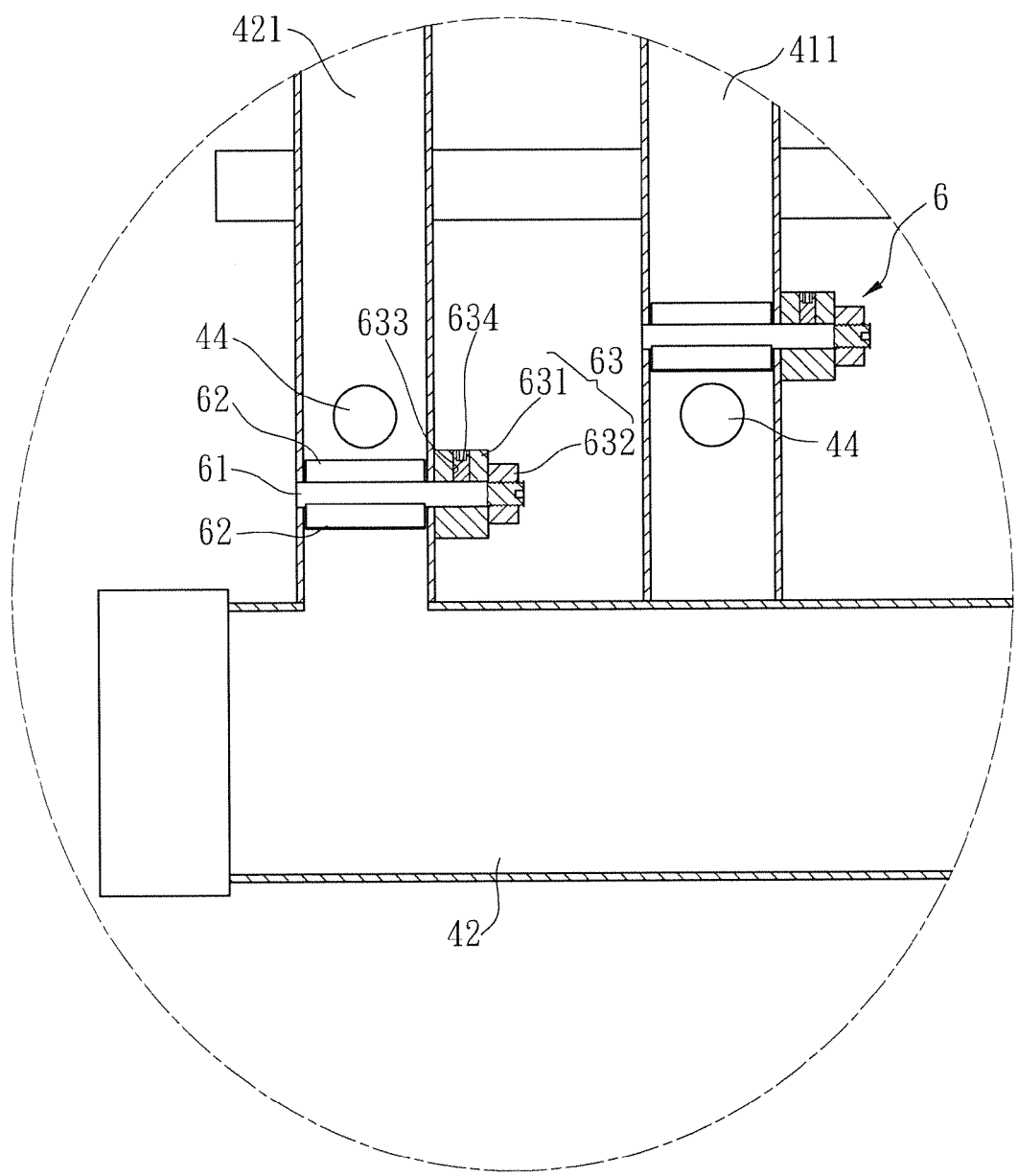
FIG. 5 is a blow-up view of Part A of FIG. 1.
Figure 6:
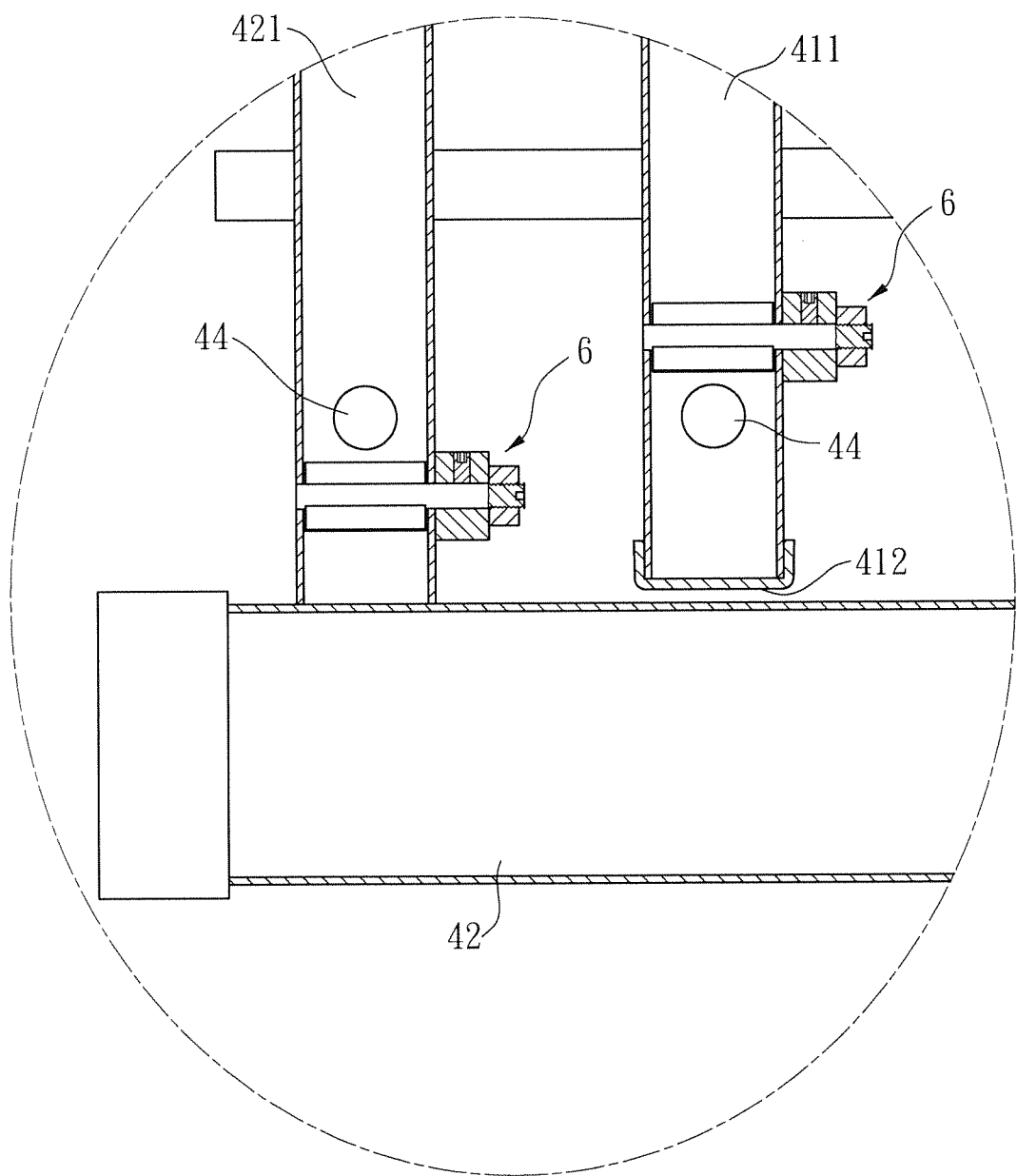
FIG. 6 is a blow-up view of Part A of FIG. 1 in accordance with another implementation mode.

In FIG. 1, the frame 1 has an air supply pipeline 4 for supplying air into the container 2 of each cubicle 14. The air supply pipeline 4 and an external air filter 5 constitute a circulation, and the air supply pipeline 4 includes a main intake pipe 41 and a main extraction pipe 42, and one of these pipes 41, 42 is installed above the frame 1, and the other one is installed under the frame 1, and each vertical unit 12 between the two main pipes 41, 42 has a branch intake pipe 411 and a branch extraction pipe 421. In FIG. 5, the branch intake pipe 411 is interconnected with the main intake pipe (not shown in the figure), and the end proximate to the branch intake pipe 411 has a closed end proximate to the main extraction pipe 42, and the branch extraction pipe 421 is interconnected with the main extraction pipe 42, and the branch extraction pipe 421 has a closed end (not shown in the figure) proximate to the main intake pipe. With reference to FIG. 6 for another implementation mode, the branch intake pipe 411 has a cover 412 for sealing an end proximate to the main extraction pipe 42, and the branch extraction pipe 421 has a cover for sealing an end proximate to the main intake pipe (not shown in the figure). In FIGS. 3 and 4, the branch intake pipe 411 and the branch extraction pipe 421 has a through hole 44 formed separately at a position corresponsive to each cubicle 14, and each through hole 413 has a joint 43, and the joint 43 has a channel 431 interconnected with the branch intake pipe 411 or the branch extraction pipe 421, and two air exchange ports 22 are formed at the rear side of the container 2 for connecting the joint 43 of the branch intake pipe 411 and the branch extraction pipe 421, so that air can enter from the branch intake pipe 411 into the container 2 or from the container 2 into the branch extraction pipe 421.

In addition, the air supply pipeline 4 has an adjusting device 6 installed thereon for adjusting the amount of supplied air. In FIG. 5, the adjusting device 6 has a shaft 61 extended into the air supply pipeline, and the portion with the shaft 61 extended into the pipeline has a pair of blades 62, and the area of the blades 62 is equal to the cross-sectional area of the pipeline, and the blades 62 can be rotated together with the rotation of the shaft 61 to gradually seal the pipeline, so as to adjust the amount of air passing through the pipeline. The portion of the shaft 61 situated outside the pipeline has a fixing device 63, such that after the rotating angle of the blade 62 is adjusted, the shaft 61 is fixed onto the pipeline, wherein the fixing device 63 includes a fixing block 631 fixed onto the shaft 61, and a packing element 632 is screwed to an outer end of the shaft 61, so that the packing element 632 can be secured to abut the fixing block 631 axially against the external wall of the pipeline by the shaft 61, and the fixing block 631 has a screw hole 633 interconnected with the shaft 61, and a screw 634 is screwed into the screw hole 633, so that the screw 634 can abut against the shaft 61 to set and fix the rotating angle of the shaft 61.

Further, the adjusting device 6 is installed on the air supply pipeline 4 of the frame 1 to further define the adjusting device 6 to be installed on the main intake pipe 41 and the main extraction pipe 42, or installed on each branch intake pipe 411 and each branch extraction pipe 421. In this preferred embodiment, there is one adjusting device 6 installed on each branch intake pipe 411 and each branch extraction pipe 421 and at a position corresponsive to each joint 43, wherein the adjusting device 6 is installed at an upstream position of the airflow direction of each pipeline with respect to each joint 43, so that each adjusting device 6 can provide a direct control to the corresponding joint 43 for fine-tuning the amount of supplied air in each container 2 inside each cubicle 14 to prevent insufficient supply of air to the end of the pipeline or the death of bred animals due to the insufficient supply of air.

The invention claimed is:

1. An air supply apparatus for experimental husbandry equipment, comprising:
   a frame, partitioned by a plurality of support frames to form a plurality of cubicles, wherein each cubicle is mounted with a corresponding container; and
   an air supply pipeline, installed on the frame, and constituting a circulation with an external air filter, and the air supply pipeline including
   a main intake pipe and a main extraction pipe, and
   a branch intake pipe and a branch extraction pipe being installed between the two main pipes, and the branch intake pipe being interconnected to the main intake pipe, and the branch extraction pipe being interconnected to the main extraction pipe; and the branch intake pipe and the branch extraction pipe having a through hole formed on each corresponding cubicle, and each through hole includes a joint installed therein; and
   each branch intake pipe and each branch extraction pipe having an adjusting device for adjusting the amount of supplied air; such that a container for each corresponding cubicle is provided for containing and breeding an experimental animal, and two air exchange ports being formed at the rear side of each container and coupled to the joints of the branch intake pipe and the branch extraction pipe of each cubicle respectively;
   wherein the adjusting device includes a shaft extending into the air supply pipeline, and the portion with the shaft extending into the pipeline has a blade rotatable with the rotation of the shaft to gradually seal the pipeline for adjusting the amount of air passing through the pipeline; and a portion of the shaft situated outside the pipeline has a fixing device for fixing the shaft to the pipeline after the rotating angle of the shaft is adjusted.

2. The air supply apparatus for experimental husbandry equipment according to claim 1, wherein the branch intake pipe has a closed end proximate to the main extraction pipe, and the branch extraction pipe has a closed end proximate to the main intake pipe.

3. The air supply apparatus for experimental husbandry equipment according to claim 1, wherein the branch intake pipe has a cover for sealing an end proximate to the main extraction pipe, and the branch extraction pipe has a cover for sealing an end proximate to the main intake pipe.

4. The air supply apparatus for experimental husbandry equipment according to claim 1, wherein the adjusting device is installed on each of the branch intake pipe and the branch extraction pipe at a position thereon to be adjacent a corresponding joint , and the adjusting device is installed at an upstream position of each joint with respect to the airflow direction of each pipeline.

5. The air supply apparatus for experimental husbandry equipment according to claim 1, wherein one of the main intake pipe and the main extraction pipe is installed above the frame and the other one is installed under the frame.

6. The air supply apparatus for experimental husbandry equipment according to claim 1, wherein each cubicle has a transversal support frame extended in a direction of installing the container, and the transversal support frame has a pad, and each container has a wing portion disposed separately on both sides of the container, and the wing portion of the container abuts the pad to fix the container in the cubicle, and a positioning portion in the shape of a hook disposed separately on the bottom of each end on both left and right sides of the pad and provided for downwardly hooking the transversal support frame.

7. The air supply apparatus for experimental husbandry equipment according to claim 6, wherein the pad has a stop portion extended upwardly from the top of each of the front and rear sides of the pad.

8. The air supply apparatus for experimental husbandry equipment according to claim 6, wherein the pad has a fitting element extended backwardly from a front side of the bottom of the pad, and the transversal support frame is hollow and has an embedding hole for embedding the pad into the transversal support frame by the fitting element to fix the pad onto the transversal support frame.

9. An air supply apparatus for experimental husbandry equipment, comprising:
   a frame, partitioned by a plurality of support frames to form a plurality of cubicles, wherein each cubicle is mounted with a corresponding container; and
   an air supply pipeline, installed on the frame, and constituting a circulation with an external air filter, and the air supply pipeline including
   a main intake pipe and a main extraction pipe, and
   a branch intake pipe and a branch extraction pipe being installed between the two main pipes, and the branch intake pipe being interconnected to the main intake pipe, and the branch extraction pipe being interconnected to the main extraction pipe; and the branch intake pipe and the branch extraction pipe having a through hole formed on each corresponding cubicle, and each through hole includes a joint installed therein; and each branch intake pipe and each branch extraction pipe having an adjusting device for adjusting the amount of supplied air; such that each container associated with a corresponding cubicle is provided for containing and breeding an experimental animal, and two air exchange ports being formed at the rear side of each container and coupled to the joints of the branch intake pipe and the branch extraction pipe of each cubicle respectively;

wherein each cubicle has a transversal support frame extended in a direction of installing the container, and the transversal support frame has a pad, and each container has a wing portion disposed separately on both sides of the container, and the wing portion of the container abuts the pad to fix the container in the cubicle, and a positioning portion in the shape of a hook disposed separately on the bottom of each end on both left and right sides of the pad and provided for downwardly hooking the transversal support frame.

10. The air supply apparatus for experimental husbandry equipment according to claim 9, wherein the pad has a fitting element extended backwardly from a front side of the bottom of the pad, and the transversal support frame is hollow and has an embedding hole for embedding the pad into the transversal support frame by the fitting element to fix the pad onto the transversal support frame.

11. An air supply apparatus for experimental husbandry equipment, comprising:

a frame, partitioned by a plurality of support frames to form a plurality of cubicles, wherein each cubicle is mounted with a corresponding container; and an air supply pipeline, installed on the frame, and constituting a circulation with an external air filter, and the air supply pipeline including a main intake pipe and a main extraction pipe, and a branch intake pipe and a branch extraction pipe being installed between the two main pipes, and the branch intake pipe being interconnected to the main intake pipe, and the branch extraction pipe being interconnected to the main extraction pipe; and the branch intake pipe and the branch extraction pipe having a through hole formed on each corresponding cubicle, and each through hole includes a joint installed therein; and each branch intake pipe and each branch extraction pipe having an adjusting device for adjusting the amount of supplied air; such that each container associated with a corresponding cubicle is provided for containing and breeding an experimental animal, and two air exchange ports being formed at the rear side of each container and coupled to the joints of the branch intake pipe and the branch extraction pipe of each cubicle respectively;

wherein each cubicle has a transversal support frame extended in a direction of installing the container, and the transversal support frame has a pad, and each container has a wing portion disposed separately on both sides of the container, and the wing portion of the container abuts the pad to fix the container in the cubicle, and a positioning portion in the shape of a hook disposed separately on the bottom of each end on both left and right sides of the pad and provided for downwardly hooking the transversal support frame;

wherein the pad has a stop portion extended upwardly from the top of each of the front and rear sides of the pad.

* * * * *